(12) United States Patent
Shoji

(10) Patent No.: US 6,184,506 B1
(45) Date of Patent: Feb. 6, 2001

(54) CATALYST CARRIER

(75) Inventor: Tohru Shoji, Kanagawa-ken (JP)

(73) Assignee: Tanaka Kikinzoku Kogyo K.K., Tokyo (JP)

( * ) Notice: Under 35 U.S.C. 154(b), the term of this patent shall be extended for 0 days.

(21) Appl. No.: 09/269,239

(22) PCT Filed: Sep. 4, 1998

(86) PCT No.: PCT/JP98/03986

§ 371 Date: Mar. 22, 1999

§ 102(e) Date: Mar. 22, 1999

(87) PCT Pub. No.: WO99/12645

PCT Pub. Date: Mar. 18, 1999

(30) Foreign Application Priority Data

Sep. 8, 1997 (JP) .................................................. 9-242333

(51) Int. Cl.[7] ..................................................... H05B 3/06
(52) U.S. Cl. ............................. 219/537; 392/488; 60/300
(58) Field of Search ........................... 219/537; 392/485, 392/488; 55/DIG. 30; 422/174, 177; 60/300, 303

(56) References Cited

U.S. PATENT DOCUMENTS

| | | | |
|---|---|---|---|
| 3,541,304 | * | 11/1970 | Cohn ..................................... 392/488 |
| 3,770,389 | * | 11/1973 | Kitzner et al. ........................ 392/488 |
| 4,233,494 | * | 11/1980 | Pawlik et al. ........................ 219/537 |
| 4,645,912 | * | 2/1987 | Ando et al. ........................... 219/537 |
| 5,409,669 | * | 4/1995 | Smith et al. ............................ 60/300 |
| 5,494,642 | * | 2/1996 | Sanada et al. ........................ 392/488 |
| 5,519,191 | * | 5/1996 | Ketcham et al. ..................... 392/485 |
| 5,852,274 | * | 12/1998 | Watanabe et al. ................... 422/174 |
| 5,908,480 | * | 6/1999 | Ban et al. ....................... 55/DIG. 30 |

FOREIGN PATENT DOCUMENTS

| | | |
|---|---|---|
| 3-72953 | 3/1991 | (JP) . |
| 4-203416 | 7/1992 | (JP) . |
| 5-312029 | 11/1993 | (JP) . |

* cited by examiner

*Primary Examiner*—Teresa Walberg
*Assistant Examiner*—Fadi H. Dahbour
(74) *Attorney, Agent, or Firm*—Jordan and Hamburg LLP

(57) ABSTRACT

An object of the present invention is to provide a catalyst carrier suitable for use of three-phase alternating current. In the present invention, three catalyst foils are spirally wound and surface contact among the catalyst foils is prevented thereby allowing the catalyst carrier to be connected to a three-phase alternating current source. Each of the catalyst foils is a strip-shaped conductive foil formed of a heat-resistant alloy, and a wavy shape is imparted to the foil. Further, an insulating layer and a catalyst-carrying layer are formed on a surface of the catalyst foil.

54 Claims, 4 Drawing Sheets

CATALYST CARRIER

BACKGROUND OF THE INVENTION

The present invention relates to a catalyst carrier which can be electrified in order to effect heating.

Conventionally, there have been known various types of catalyst carriers, such as those for use with single-phase alternating current and those for automobile exhaust gas. When a large catalyst apparatus, such as a deodorizing apparatus is produced, there arises a desire for use of three-phase alternating current, which is widely used in large machinery. However, to the best of the present inventor's knowledge, no conventional catalyst carrier for use with single-phase alternating current or for automobile exhaust gas is designed for consideration of use of three-phase alternating current. In order to use three-phase alternating current, at least three catalyst foils are required; one for each of the three phases of a power source. However, if catalyst foils, each having a wavy longitudinal cross section and a straight lateral cross section are merely rolled, formation of a large number of uniform channels serving as gas passages is difficult. Further, catalyst apparatuses for automobile exhaust gas are designed to be driven by power sources producing a voltage as low as 12 volts. Thus, insulation for catalyst foils is complete only in a small number of catalyst apparatuses. Therefore, these catalyst apparatuses are not considered suitable for use with a three-phase alternating current power source that provides a standard voltage (200 V).

SUMMARY OF THE INVENTION

An object of the present invention is to provide a catalyst carrier capable of being electrified in order to effect heating, in which three catalyst foils, having a predetermined shape, are spirally wound and surface contact among the catalyst foils is prevented to thereby allow the catalyst carrier to be connected to a three-phase alternating current source, thus enabling use of a three-phase alternating current source as well as enabling an increase in a size of a catalyst apparatus.

The present invention provides a catalyst carrier capable of being electrified in order to effect heating, in which three catalyst foils are spirally wound, namely meshed with each other while surface contact among the catalyst foils is prevented, to thereby allow the catalyst carrier to be connected to a three-phase alternating current source. Each of the catalyst foils is a strip-shaped conductive foil formed of a heat-resistant alloy and having a wavy shape, that is, a wave contour with a wave direction generally in a longitudinal direction of the strip-shape, is imparted thereto. Further, an insulating layer and a catalyst-carrying layer are formed on the surface of the catalyst foil.

Imparting a wavy shape to the strip-shaped metal foil refers to forming the metal foil such that the metal foil has a wavy, uneven cross section including periodical crests and valleys formed in a widthwise direction of the strip-shaped foil. The crests and valleys are provided in a herringbone shape, for example, in which the crests and valleys have acute angles, for instance, and are repeated periodically. Three catalyst foils to which the above-described wavy shape have been imparted are wound in a state in which surface contact does not occur among the catalyst foils. Therefore, the catalyst foils are not superposed in a state in which the wavy portions of adjacent catalyst foils fit into each other. Thus, a large number of channels for gas passages are formed between the adjacent catalyst foils. The prevention of surface contact among the catalyst foils is achieved by employment of a configuration in which the catalyst foils are wound in a state in which a phase difference is produced between the periodic crest and valleys of adjacent catalyst foils. If a plurality of catalyst foils whose cross section are wavy only in a longitudinal direction, i.e., wavy in the longitudinal direction but straight in the widthwise direction, are wound, the wavy portions of the catalyst foils fit into each other, so that channels for gas passages are not formed properly. In order to avoid such a problem, the catalyst foils whose cross sections are wavy only in a longitudinal direction are wound in a state in which a flat foil, serving as a spacer, is interposed between the wavy foils. In the present invention such spacers are not required, accordingly, the number of foils required to form a rolled catalyst carrier is decreased.

Further, when a catalyst carrier is formed from six films including wavy films and flat films in order to allow use of three-phase alternating current, two foils, i.e., a spacer and a catalyst foil serving as a resistor, are connected to each line of a three-phase alternating current source. In other words, two conductors are connected in parallel. Therefore, the resistance of each line decreases. By contrast, in the present invention described described above, a single catalyst foil is connected to each line of a three-phase alternating current source, so that the resistance for each line is greater compared to the case where the spacer foil is required. Consequently, the catalyst carrier can be electrified with high efficiency even when three-phase alternating current is used.

The present invention further provides an embodiment having a catalyst carrier in which first ends of the three superposed catalyst foils are connected to a center rod. The catalyst foils are wound spirally around the center rod and second ends of the catalyst foils, located at the peripheral side of the spiral, and the center rod are connected to a three-phase alternating current source. In this case, since the catalyst foils form a star connection, which is generally used for connection with a three-phase alternating current source, a large-sized catalyst apparatus can be formed easily.

The present invention still further provides an embodiment of a catalyst carrier in which opposite ends of the three catalyst foils are mutually connected at connection portions to form an endless catalyst foil having a substantially equilateral-triangular cross section. Center portions of the catalyst foils, which constitute sides of the triangle, are moved uniformly toward a center of the triangular cross section. Subsequently, the connection portions are rotated about a vertical axis passing through the center in order to wind the catalyst foils. Further, the connection portions are located on a peripheral edge of the spiral and are connected to a three-phase alternating current source in order to establish a delta connection. In this case, since the catalyst foils form a delta connection, which is generally used for connection with a three-phase alternating current source, a large-sized catalyst apparatus can be formed easily. Further, unlike the case of the star connection, no center rod is required, so that the gas passage area of the catalyst carrier is increased. The center of the equilateral-triangular cross section denotes a center of gravity of the equilateral-cross section.

The present invention yet further provides an improvement of the catalyst carrier according to any of the above configurations in which the three catalyst foils are superposed and wound spirally in a state in which respective longitudinal sides of the catalyst foils are slightly offset from one another in the widthwise direction. In catalyst foils capable of being electrified, an insulating layer is provided on a surface of each catalyst foil in order to prevent occurrence of a short circuit between adjacent catalyst foils. However, since the insulating layer is difficult to form at side edge portions of the catalyst foils, when the catalyst foils are wound, a short circuit may occur, especially between the edges of the longitudinal sides of adjacent catalyst foils. The offset longitudinal sides prevent an occurrence of a short circuit, which would otherwise occur between the side edges of the longitudinal sides of adjacent catalyst foils when the catalyst foils are wound. Therefore, the catalyst carrier according to the present invention can be electrified efficiently in order to effect heating.

DETAILED DESCRIPTION

Figure 1:
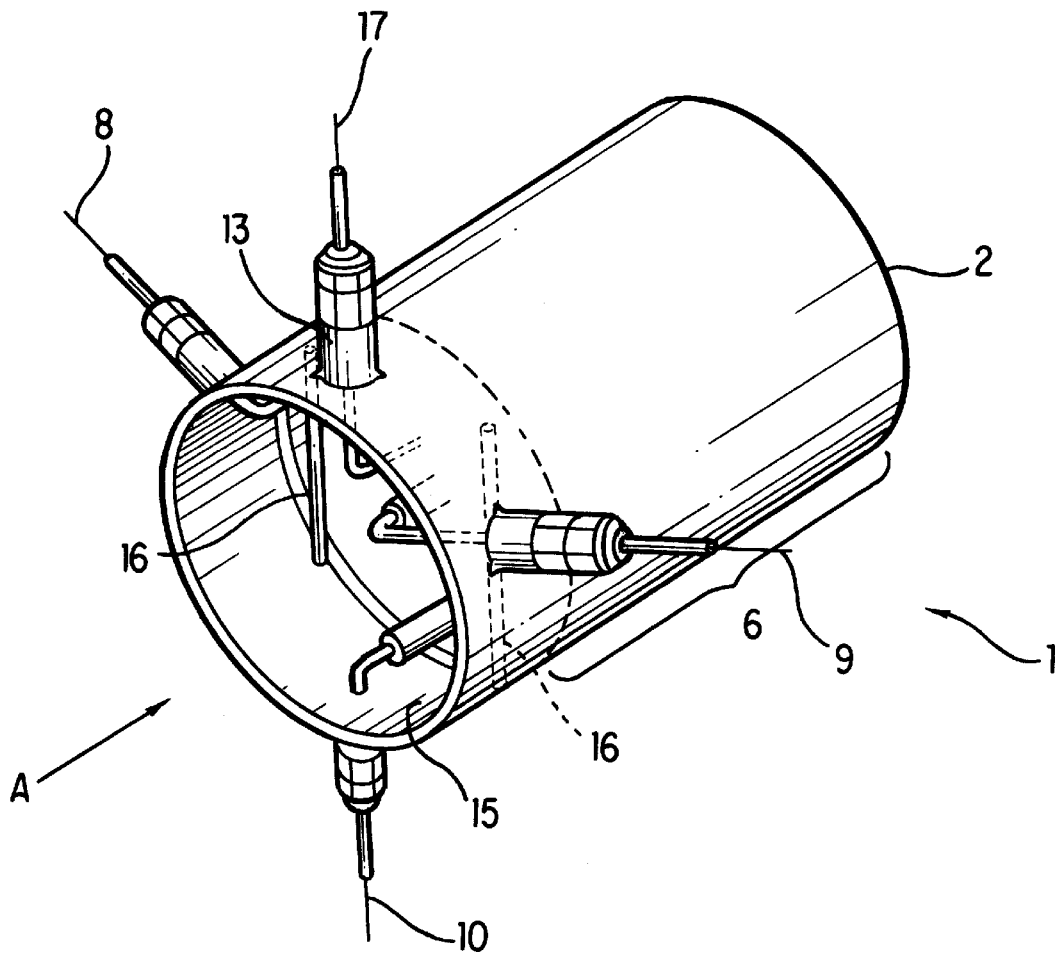
FIG. 1 is a perspective view of a catalysis apparatus according to an embodiment of the present invention.

An embodiment of the present invention is now be described. Referring to FIG. 1, a catalyst apparatus 1 for use with three-phase alternating current has a tubular casing 2 accommodating a catalyst carrier 6 composed of three catalyst foils 3, 4, and 5, which are wound spirally in an overlapped manner. Each of the catalyst foils 3, 4, and 5 is formed from a strip-shaped metal foil of a heat resistant alloy.

Figure 2:
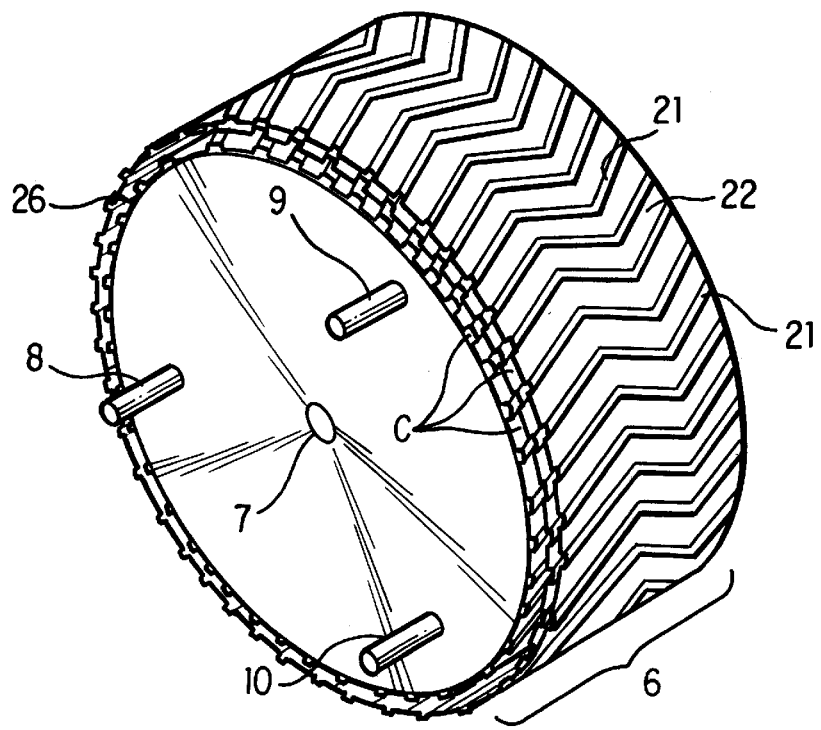
FIG. 2 is a perspective view showing a state in which three catalyst foils are spirally wound and electrodes are provided for the catalyst foils.
Figure 3A:
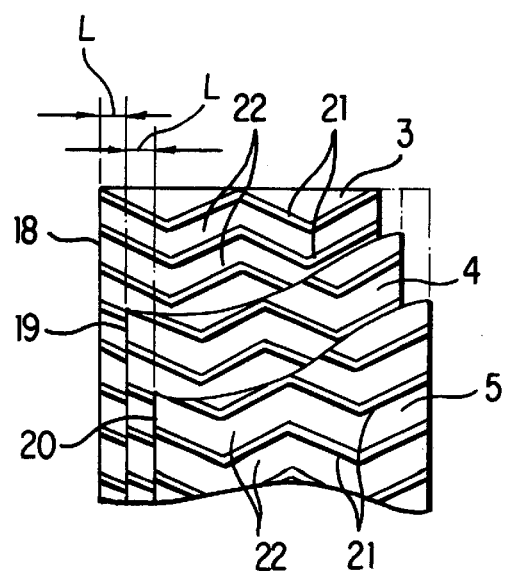
FIGS. 3(a) and 3(b) are cut-away views showing states in which the catalyst foils are offset from one another.
Figure 3B:
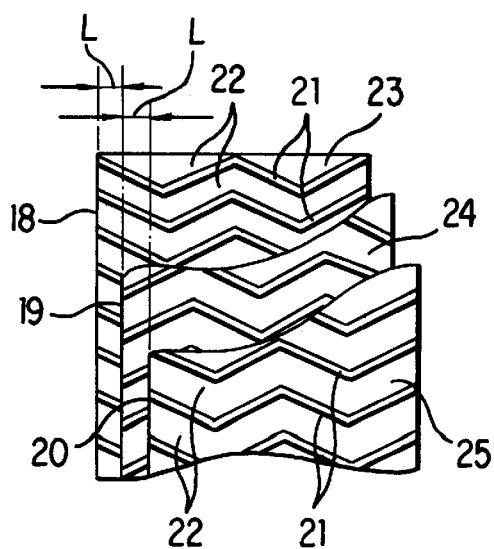

Referring to FIGS. 2, 3(a) and 3(b), each of the catalyst foils 3, 4, and 5 is formed to have a herringbone pattern. The metal foil is formed of a stainless-steel heat-resistant alloy containing aluminum (Fe-20%Cr-5%Al-0.08La). In each of the catalyst foils 3, 4, and 5, over an entire surface of the metal foil having the herringbone pattern, aluminum whiskers are generated, an insulating layer is formed, a washcoat is applied, and a noble metal serving as a catalyst is applied. Specifically, a metal foil of Fe-20%Cr5%Al-0.08La having a thickness of about 50 μm is heat-treated at 900° C. for 15 hours in order to form whiskers of aluminum oxide on the surface of the foil. The whiskers serve as anchors for increasing strength of close contact with the washcoat, crystallized glass, and noble metal (catalyst) applied onto the surface of the foil. The washcoat contains $SiO_2$ (95%) and $ZrO_2$ (5%) and is applied by use of a spray coater. The crystallized glass is applied by, for example, the method disclosed in Japanese Patent Application Laid-Open (kokai) No. 4-198039. Further, platinum is used as the noble metal serving as the catalyst.

Figure 4:
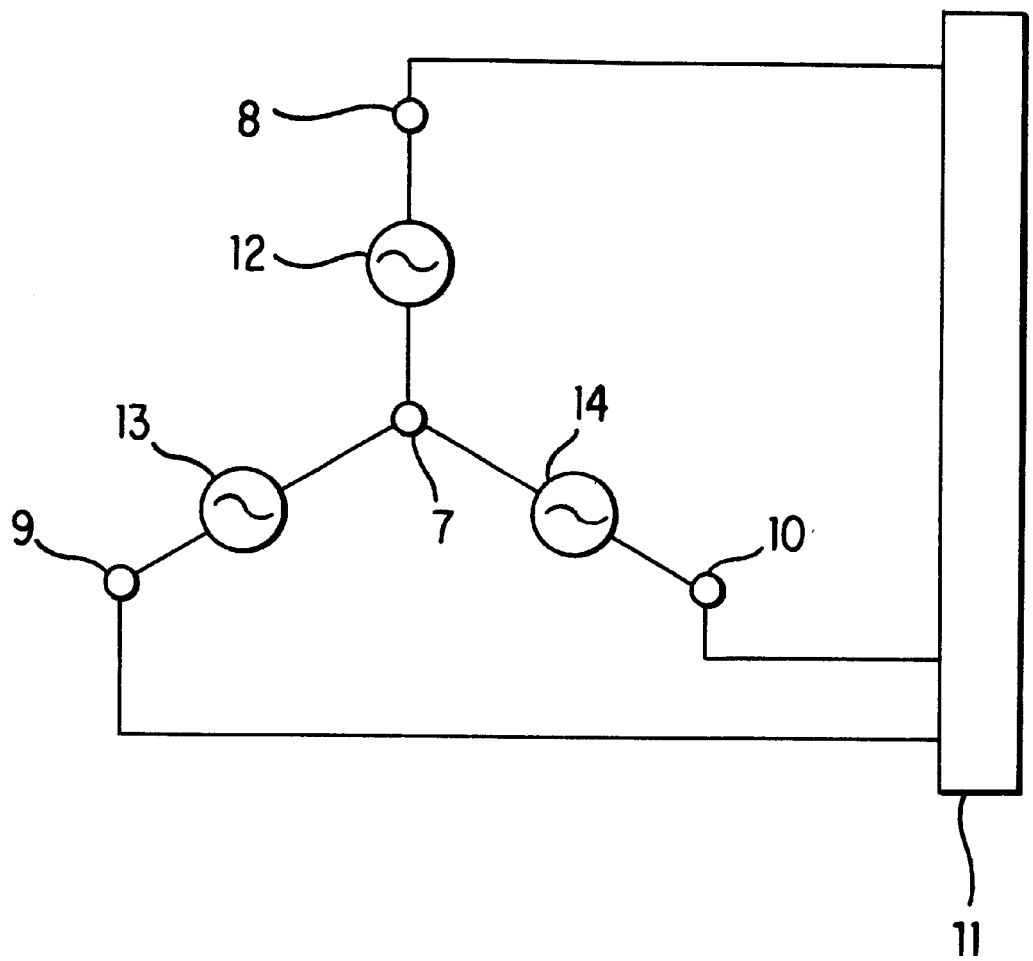
FIG. 4 is a connection diagram showing a star connection.

The catalyst carrier 6 is formed through an operation of spirally winding the three superposed catalyst foils 3, 4, and 5 having a same width and length. Respective inner ends of the catalyst foils 3, 4, and 5 are connected to a center rod 7 disposed at a center of the catalyst carrier 6. Further, outer electrodes 8, 9, and 10 are connected to outer ends of the respective catalyst foils 3, 4, and 5. Thus, a star connection is formed between the center rod 7 and the outer electrodes 8, 9, and 10. FIG. 4 shows the configuration of the star connection. Reference numeral 11 denotes a three-phase load; reference numeral 12 denotes a first phase; reference numeral 13 denotes a second phase, and reference numeral 14 denotes a third phase. Such a star connection simplifies the arrangement of electrodes, and also simplifies the overall design of the catalyst apparatus.

Referring to FIG. 1 again, an insulating coat material 15, serving as insulating means, is applied on the inner surface of the tubular casing 2. Further, paired right and left insulating stoppers 16 for positioning are disposed on a near side, and an insulating bar (unillustrated) is disposed on the far side. The insulating coat 15, the insulating stoppers 16, the insulating bar, and the like constitute the insulating means. The catalyst carrier 6 is accommodated within the tubular casing 2 via the insulating means. Reference numeral 17 denotes a thermocouple.

As shown in FIG. 3(a), the three catalyst foils 3, 4, and 5 are wound in a state in which a widthwise offset L is provided between a longitudinal side 18 of the catalyst carrier foil 3 and a longitudinal side 19 of the catalyst carrier foil 4, as well as between the longitudinal side 19 of the catalyst carrier foil 4 and a longitudinal side 20 of the catalyst carrier foil 5.

The three catalyst foils 3, 4, and 5 have the same herringbone pattern. As shown in FIG. 2, the herringbone pattern includes crest portions 21 and valley portions 22, which are wider than the crest portions 21. Further, the superposed catalyst foils 3, 4, and 5 are wound in a state such that their longitudinal sides are slightly offset from one another in a width direction. Therefore, when the superposed catalyst foils 3, 4, and 5 are wound, the adjacent catalyst foils interfere with each other, so that a large number of channels C having an identical sectional shape are formed between the adjacent catalyst foils to thereby form gas passages. Further, as shown in FIG. 3(b), the superposed catalyst foils 3, 4, and 5 may be superposed and wound such that the pattern of the crest and valley portions, 21 and 22, of the intermediate catalyst foil 24 is a mirror image of the pattern of the crest and valley portions, 21 and 22, of the catalyst foils 23 and 25, which sandwich the intermediate catalyst foil 24. That is, a phase shift of a half period of the pattern is produced between the intermediate catalyst foil 24 and the outside catalyst foils 23 and 25. This structure more effectively prevents close contact among the catalyst foils 23, 24 and 25.

Figure 5A:
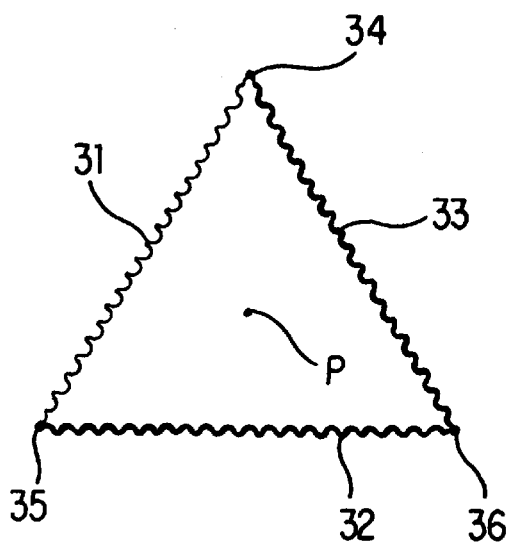
FIGS. 5(a) and 5(b) show a diagrams of a manner of winding catalyst foils for formation of a delta connection.
Figure 5B:
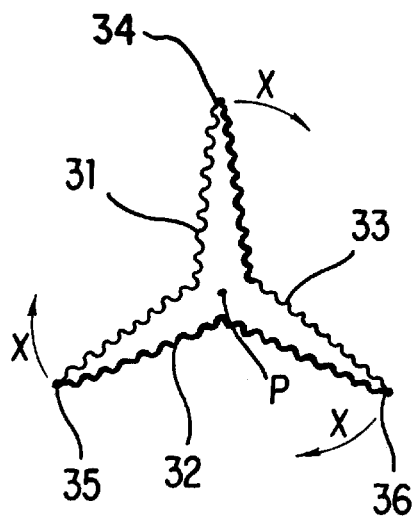
Figure 6:
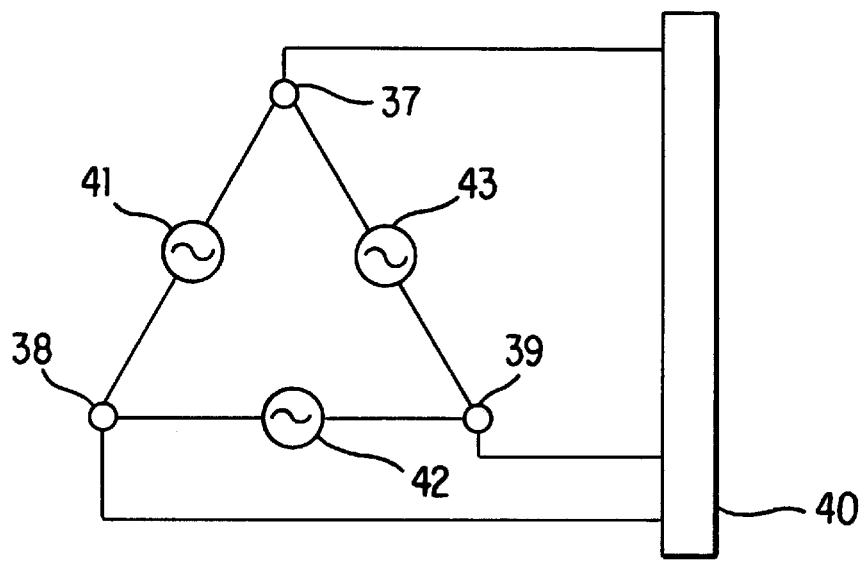
FIG. 6 is a connection diagram showing a delta connection.

Referring to FIGS. 5(a) and 5(b), a catalyst carrier for a delta connection is formed having a manner of winding catalyst foils in order to form a delta connection. First, as shown in FIG. 5(a), the longitudinal ends of three catalyst foils 31, 32, and 33 having the same length and width are connected to one another in an endless manner, so that the catalyst foils 31, 32, and 33 assume an equilateral-triangular cross section when viewed from the side. Subsequently, as shown in FIG. 5(b), longitudinally center portions of the catalyst foils 31, 32, and 33, which constitute respective sides of the equilateral triangle, are moved toward a center (centroid) P of the equilateral triangle. Subsequently, connection portions 34, 35, and 36 are rotated about a vertical axis, passing through the center P, in a direction of arrow X in order to spirally wind the catalyst foils 31, 32, and 33. Further, electrodes are provided at the connection portions 34, 35, and 36 of the spirally wound catalyst carrier. Thus, a delta connection is established. FIG. 6 shows the configuration of the delta connection, wherein reference numeral 40 denotes a three-phase load; reference numeral 41 denotes a first phase; reference numeral 42 denotes a second phase, and reference numeral 43 denotes a third phase. As in the case of the above-described star connection, the catalyst carrier having a delta connection can be built into a tubular case so as to obtain a catalyst apparatus. Further, the catalyst foils may be wound such that longitudinal sides of the catalyst foils are shifted from each other in the widthwise direction, as described for the case of star connection.

As described above, the present invention enables use of three-phase alternating current and also enables easy provision of a large-sized catalyst apparatus. Further, in the case in which an electric heater is built into a catalyst apparatus located on a upstream side of the catalyst carrier in order to heat gas flowing into the catalyst carrier to thereby accelerate catalytic reaction, such a electric heater can be omitted, because the catalyst carrier itself is electrified. Therefore, space for installation of an electric heater can be eliminated.

What is claimed is:

1. A catalyst carrier to which electric power is applied to effect heating, the catalyst carrier comprising:
   first, second and third catalyst foils having a strip shape defining a longitudinal direction and a widthwise direction, said first, second and third catalyst foils being formed of a conductive foil of a heat-resistant alloy;
   said first, second and third catalyst foils having a wave contoured shape in cross section with a wave direction, extending generally in the longitudinal direction, and having crests and valleys extending generally in the widthwise direction;
   said first, second and third catalyst foils including an insulating layer and a catalyst-carrying layer;
   said first, second and third catalyst foils being wound spirally together to form a spiral with said first, second and third catalyst foils directly contacting one another at surface portions thereof but such that electrical contact between said first, second and third catalyst foils at said surface portions is prevented by said insulating layer; and
   said first, second and third catalyst foils having connection means for applying three phase alternating current thereto to effect heating of said first, second and third catalyst foils.

2. The catalyst carrier according to claim 1, wherein:
   said connection means includes said first, second and third catalyst foils having first ends connected to a center rod;
   said first, second and third catalyst foils are wound spirally around said center rod; and
   said connection means includes said first, second and third catalyst foils having second ends located at a peripheral portion of said spiral, said second ends and said center rod being disposed for connection to a three-phase alternating current source.

3. The catalyst carrier according to claim 2 wherein said catalyst-carrying layer is disposed over said insulating layer.

4. The catalyst carrier according to claim 3 wherein said insulating layer is disposed on at least one surface of said conductive foil.

5. The catalyst carrier according to claim 2 wherein said insulating layer is disposed on at least one surface of said conductive foil.

6. The catalyst carrier according to claim 2 wherein said first, second and third catalyst foils each have said wave contoured shape offset from one another such that said crests and said valleys define channels through said spiral.

7. The catalyst carrier according to claim 6 wherein said crests and said valleys extend non-linearly.

8. The catalyst carrier according to claim 7 wherein said crests and said valleys are formed in a herring bone configuration.

9. The catalyst carrier according to claim 1 wherein said catalyst-carrying layer is disposed over said insulating layer.

10. The catalyst carrier according to claim 9 wherein said insulating layer is disposed on at least one surface of said conductive foil.

11. The catalyst carrier according to claim 1 wherein said insulating layer is disposed on at least one surface of said conductive foil.

12. The catalyst carrier according to claim 1 wherein said first, second and third catalyst foils each have said wave contoured shape offset from one another such that said crests and said valleys define channels through said spiral.

13. The catalyst carrier according to claim 12 wherein said crests and said valleys extend non-linearly.

14. The catalyst carrier according to claim 13 wherein said crests and said valleys are formed in a herring bone configuration.

15. A catalyst carrier to which electric power is applied to effect heating, the catalyst carrier comprising:
   first, second and third catalyst foils having a strip shape defining a longitudinal direction and a widthwise direction, said first, second and third catalyst foils being formed of a conductive foil of a heat-resistant alloy;
   said first, second and third catalyst foils having a wave contoured shape in cross section with a wave direction, extending generally in the longitudinal direction, and having crests and valleys extending generally in the widthwise direction;
   said first, second and third catalyst foils including an insulating layer and a catalyst-carrying layer;
   said first, second and third catalyst foils being wound spirally together to form a spiral with said first, second and third catalyst foils such that electrical contact between said first, second and third catalyst foils at surface portions thereof is prevented by said insulating layer, said spiral being wound in a configuration wherein:
      said first, second and third catalyst foils each have opposite ends which are connected at connection portions to said opposites ends of other ones of said first, second and third catalyst foils to form an endless catalyst foil having a substantially equilateral-triangular cross section prior to winding with said first, second and third catalyst foils being sides thereof;
      said first, second and third catalyst foils each having center portions moved uniformly toward a center of the triangular cross section prior to winding said spiral; and
      said connection portions are rotated about a vertical axis passing through the center while said center portions are maintained at position at the center in order to wind said spiral such that said connection portions are disposed at a periphery of said spiral once wound; and
   said first, second and third catalyst foils having said connection portions located at a periphery of said spiral for connection to a three-phase alternating current source in order to establish a delta connection.

16. A catalyst carrier according to claim 3, wherein said first, second and third catalyst foils are superposed in said spiral with respective longitudinal sides thereof offset from one another in the widthwise direction.

17. The catalyst carrier according to claim 16 wherein said catalyst-carrying layer is disposed over said insulating layer.

18. The catalyst carrier according to claim 17 wherein said insulating layer is disposed on at least one surface of said conductive foil.

19. The catalyst carrier according to claim 16 wherein said insulating layer is disposed on at least one surface of said conductive foil.

20. The catalyst carrier according to claim 16 wherein said first, second and third catalyst foils each have said wave contoured shape offset from one another such that said crests and said valleys define channels through said spiral.

21. The catalyst carrier according to claim 20 wherein said crests and said valleys extend non-linearly.

22. The catalyst carrier according to claim 21 wherein said crests and said valleys are formed in a herring bone configuration.

23. The catalyst carrier according to claim 16 wherein said first, second and third catalyst foils are wound spirally together to form said spiral with said first, second and third catalyst foils directly contacting one another at surface portions thereof but such that electrical contact between said first, second and third catalyst foils at said contacting surface portions is prevented by said insulating layer.

24. The catalyst carrier according to claim 15 wherein said catalyst-carrying layer is disposed over said insulating layer.

25. The catalyst carrier according to claim 24 wherein said insulating layer is disposed on at least one surface of said conductive foil.

26. The catalyst carrier according to claim 15 wherein said insulating layer is disposed on at least one surface of said conductive foil.

27. The catalyst carrier according to claim 15 wherein said first, second and third catalyst foils each have said wave contoured shape offset from one another such that said crests and said valleys define channels through said spiral.

28. The catalyst carrier according to claim 27 wherein said crests and said valleys extend non-linearly.

29. The catalyst carrier according to claim 28 wherein said crests and said valleys are formed in a herring bone configuration.

30. The catalyst carrier according to claim 15 wherein said first, second and third catalyst foils are wound spirally together to form said spiral with said first, second and third catalyst foils directly contacting one another at surface portions thereof but such that electrical contact between said first, second and third catalyst foils at said contacting surface portions is prevented by said insulating layer.

31. A catalyst carrier to which electric power is applied to effect heating, the catalyst carrier comprising:
   first, second and third catalyst foils having a strip shape defining a longitudinal direction and a widthwise direction, said first, second and third catalyst foils being formed of a conductive foil of a heat-resistant alloy;
   said first, second and third catalyst foils having a wave contoured shape in cross section with a wave direction, extending generally in the longitudinal direction, and having crests and valleys extending generally in the widthwise direction;
   said first, second and third catalyst foils including an insulating layer and a catalyst-carrying layer;
   said first, second and third catalyst foils being wound spirally together to form a spiral such that electrical contact between said first, second and third catalyst foils at surface portions thereof is prevented by said insulating layer, said first, second and third catalyst foils being superposed in said spiral with respective longitudinal sides thereof offset from one another in the widthwise direction; and
   said first, second and third catalyst foils having connection means for applying three phase alternating current thereto to effect heating of said first, second and third catalyst foils.

32. The catalyst carrier according to claim 31 wherein said catalyst-carrying layer is disposed over said insulating layer.

33. The catalyst carrier according to claim 32 wherein said insulating layer is disposed on at least one surface of said conductive foil.

34. The catalyst carrier according to claim 31 wherein said insulating layer is disposed on at least one surface of said conductive foil.

35. The catalyst carrier according to claim 31 wherein said first, second and third catalyst foils each have said wave contoured shape offset from one another such that said crests and said valleys define channels through said spiral.

36. The catalyst carrier according to claim 35 wherein said crests and said valleys extend non-linearly.

37. The catalyst carrier according to claim 36 wherein said crests and said valleys are formed in a herring bone configuration.

38. The catalyst carrier according to claim 31 wherein said first, second and third catalyst foils are wound spirally together to form said spiral with said first, second and third catalyst foils directly contacting one another at surface portions thereof but such that electrical contact between said first, second and third catalyst foils at said contacting surface portions is prevented by said insulating layer.

39. A catalyst carrier to which electric power is applied to effect heating, the catalyst carrier comprising:
   first, second and third catalyst foils having a strip shape defining a longitudinal direction and a widthwise direction, said first, second and third catalyst foils being formed of a conductive foil of a heat-resistant alloy;
   said first, second and third catalyst foils having a wave contoured shape in cross section with a wave direction, extending generally in the longitudinal direction, and having crests and valleys extending generally in the widthwise direction;
   said first, second and third catalyst foils including an insulating layer and a catalyst-carrying layer;
   said first, second and third catalyst foils being wound spirally together to form a spiral such that electrical contact between said first, second and third catalyst foils at surface portions thereof is prevented by said insulating layer;
   said first, second and third catalyst foils having connection means for applying three phase alternating current thereto to effect heating of said first, second and third catalyst foils;
   said connection means including said first, second and third catalyst foils having first ends connected to a center rod;
   said first, second and third catalyst foils being wound spirally around said center rod;
   said connection means including said first, second and third catalyst foils having second ends located at a peripheral portion of said spiral, said second ends and said center rod being disposed for connection to a three-phase alternating current source; and
   said first, second and third catalyst foils being superposed in said spiral with respective longitudinal sides thereof offset from one another in the widthwise direction.

40. The catalyst carrier according to claim 39 wherein said catalyst-carrying layer is disposed over said insulating layer.

41. The catalyst carrier according to claim 40 wherein said insulating layer is disposed on at least one surface of said conductive foil.

42. The catalyst carrier according to claim 39 wherein said insulating layer is disposed on at least one surface of said conductive foil.

43. The catalyst carrier according to claim 39 wherein said first, second and third catalyst foils each have said wave contoured shape offset from one another such that said crests and said valleys define channels through said spiral.

44. The catalyst carrier according to claim 43 wherein said crests and said valleys extend non-linearly.

45. The catalyst carrier according to claim 44 wherein said crests and said valleys are formed in a herring bone configuration.

46. The catalyst carrier according to claim 39 wherein said first, second and third catalyst foils are wound spirally together to form said spiral with said first, second and third catalyst foils directly contacting one another at surface portions thereof but such that electrical contact between said first, second and third catalyst foils at said contacting surface portions is prevented by said insulating layer.

47. A catalyst carrier to which electric power is applied to effect heating, the catalyst carrier comprising:

catalyst foil in a strip shape defining a longitudinal direction and a widthwise direction, said catalyst foil being formed of a conductive foil of a heat-resistant alloy, said catalyst foil being connected to form a loop;

said catalyst foil having a wave contoured shape in cross section with a wave direction, extending generally in the longitudinal direction, and having crests and valleys extending generally in the widthwise direction;

said catalyst foil including an insulating layer and a catalyst-carrying layer;

said catalyst foil being wound spirally together to form a spiral such that electrical contact between surface portions of said catalyst foil is prevented by said insulating layer, said spiral being wound in a configuration wherein:

said loop of said catalyst foil has three segments of substantially equal length with connection portions formed at junctions of said segments, said connection portions being disposed at a periphery of said spiral;

said segments of said catalyst foil each having center portions disposed at a center portion of said spiral; and said catalyst foil having said connection portions located at said periphery of said spiral for connection to a three-phase alternating current source in order to establish a delta connection.

48. The catalyst carrier according to claim 47 wherein said catalyst-carrying layer is disposed over said insulating layer.

49. The catalyst carrier according to claim 48 wherein said insulating layer is disposed on at least one surface of said conductive foil.

50. The catalyst carrier according to claim 47 wherein said insulating layer is disposed on at least one surface of said conductive foil.

51. The catalyst carrier according to claim 47 wherein said segments each have said wave contoured shape offset from one another such that said crests and said valleys define channels through said spiral.

52. The catalyst carrier according to claim 51 wherein said crests and said valleys extend non-linearly.

53. The catalyst carrier according to claim 52 wherein said crests and said valleys are formed in a herring bone configuration.

54. The catalyst carrier according to claim 47 wherein said catalyst foil is wound spirally together to form said spiral with surface portions of said catalyst foil directly contacting other surface portions of said catalyst foil but such that electrical contact between said contacting surface portions of said catalyst foil is prevented by said insulating layer.

* * * * *